US008129018B2

(12) United States Patent
Hartman et al.

(10) Patent No.: US 8,129,018 B2
(45) Date of Patent: *Mar. 6, 2012

(54) SIZING FOR HIGH PERFORMANCE GLASS FIBERS AND COMPOSITE MATERIALS INCORPORATING SAME (75) Inventors: David R. Hartman, Granville, OH (US); Luc M. Peters, Soumagne (BE); Jeffrey L. Antle, Canyon, TX (US)

(73) Assignee: OCV Intellectual Capital, LLC, Toledo, OH (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/362,987

(22) Filed: Feb. 27, 2006

(65) Prior Publication Data

US 2006/0204763 A1 Sep. 14, 2006

Related U.S. Application Data (63) Continuation-in-part of application No. 11/197,864, filed on Aug. 5, 2005, which is a continuation-in-part of application No. 10/872,103, filed on Jun. 18, 2004, now Pat. No. 7,465,764.

(51) Int. Cl.
*B32B 17/04* (2006.01)
*D06M 13/50* (2006.01)
*D06M 15/55* (2006.01)
*D06M 15/564* (2006.01)

(52) U.S. Cl. ........................ 428/391; 428/375; 252/8.83
(58) Field of Classification Search .................... None
See application file for complete search history.

(56) References Cited

U.S. PATENT DOCUMENTS

| 3,032,439 | A | | 5/1962 | Müler et al. |
| 3,249,412 | A | | 5/1966 | Kolek |
| 3,262,078 | A | | 7/1966 | Foerster |
| 3,317,369 | A | | 5/1967 | Clark et al. |
| 3,445,427 | A | | 5/1969 | Larchar et al. |
| 4,049,597 | A | | 9/1977 | Motsinger |
| 4,095,010 | A | | 6/1978 | Zellar et al. |
| 4,104,434 | A | | 8/1978 | Johnson |
| 4,107,118 | A | | 8/1978 | McCoy |
| 4,140,833 | A | | 2/1979 | McCoy |
| 4,305,742 | A | | 12/1981 | Barch et al. |
| 4,338,234 | A | | 7/1982 | Moore et al. |
| 4,394,418 | A | | 7/1983 | Temple |
| 4,448,910 | A | | 5/1984 | Haines et al. |
| 4,448,911 | A | | 5/1984 | Haines et al. |
| 4,542,065 | A | | 9/1985 | Gaa |
| 4,637,956 | A | * | 1/1987 | Das et al. ........................ 428/391 |
| 4,656,084 | A | | 4/1987 | McCoy et al. |
| 4,933,381 | A | | 6/1990 | Hager |
| 5,038,555 | A | | 8/1991 | Wu et al. |
| 5,262,236 | A | | 11/1993 | Brannon |
| 5,340,903 | A | | 8/1994 | Tetart et al. |
| 5,393,379 | A | * | 2/1995 | Parrinello ...................... 162/101 |
| 5,604,270 | A | * | 2/1997 | Klett et al. ..................... 523/421 |
| 5,605,757 | A | * | 2/1997 | Klett ............................ 428/392 |
| 5,840,370 | A | | 11/1998 | Woodside et al. |
| 5,916,679 | A | | 6/1999 | Woodside et al. |
| 5,955,195 | A | | 9/1999 | Moireau |
| 6,005,026 | A | | 12/1999 | Piret et al. |
| 6,025,073 | A | | 2/2000 | Piret |
| 6,187,435 | B1 | | 2/2001 | Moireau et al. |
| 6,228,281 | B1 | * | 5/2001 | Sage ............................ 252/8.83 |
| 6,270,897 | B1 | | 8/2001 | Flautt et al. |
| 6,281,450 | B1 | | 8/2001 | Urasaki et al. |
| 6,461,735 | B1 | | 10/2002 | Furuya et al. |
| 6,514,612 | B1 | | 2/2003 | Moireau et al. |
| 6,720,080 | B2 | | 4/2004 | Murari et al. |
| 6,810,693 | B1 | | 11/2004 | Hartman et al. |
| 2002/0051888 | A1 | | 5/2002 | Murari et al. |
| 2002/0123560 | A1 | * | 9/2002 | Audenaert et al. ............. 524/588 |
| 2004/0034941 | A1 | * | 2/2004 | Iwato et al. ................... 8/115.51 |
| 2005/0279140 | A1 | * | 12/2005 | Adzima et al. .................. 65/453 |
| 2006/0036003 | A1 | * | 2/2006 | Adzima et al. ................ 523/421 |

FOREIGN PATENT DOCUMENTS

| CA | 2181485 | 8/1995 |
| CN | 1071400 | 4/1993 |
| JP | 60-255650 | 12/1985 |
| JP | 07-509434 | 10/1995 |
| WO | WO 93/06055 | 4/1993 |
| WO | 2006/007169 | 1/2006 |
| WO | 2007/100816 | 9/2007 |

OTHER PUBLICATIONS

International Search Report PCT/US2007/005062 dated Sep. 10, 2008.
European Communication dated Apr. 3, 2009, Application No. 07 751 796.9.
International Search Report PCT/US2005/018014 dated Aug. 31, 2005.
Letter from CCPIT Patent & Trademark Law Office dated Jul. 23, 2009.
US Office Action, U.S. Appl. No. 10/872,103 dated Aug. 24, 2006.
US Office Action, U.S. Appl. No. 10/872,103 dated Oct. 17, 2006.
US Office Action, U.S. Appl. No. 10/872,103 dated Mar. 20, 2007.
US Office Action, U.S. Appl. No. 10/872,103 dated May 24, 2007.
US Office Action, U.S. Appl. No. 10/872,103 dated Sep. 17, 2007.

(Continued)

*Primary Examiner* — Michael J Feely
(74) *Attorney, Agent, or Firm* — Calfee, Halter & Griswold LLP (57) ABSTRACT

A sizing composition containing an epoxy film former, a urethane film former, a silane package that includes an aminosilane coupling agent and an epoxy silane coupling agent, a cationic lubricant, a non-ionic lubricant, an antistatic agent, and at least one acid is provided. The epoxy resin emulsion includes a low molecular weight liquid epoxy resin and one or more surfactants. The epoxy resin preferably has an epoxy equivalent weight from 185-192. The sizing composition may optionally contain a methacryloxy silane. The sizing composition may be used to size glass fibers used in filament winding applications to form reinforced composite articles with improved mechanical properties, wet tensile properties, improved resistance to cracking, and improved processing characteristics.

22 Claims, 2 Drawing Sheets

OTHER PUBLICATIONS

US Office Action, U.S. Appl. No. 10/872,103 dated Mar. 17, 2008.
US Office Action, U.S. Appl. No. 11/197,864 dated Apr. 17, 2008.
US Office Action, U.S. Appl. No. 11/197,864 dated Oct. 8, 2008.
US Office Action, U.S. Appl. No. 11/197,864 dated Dec. 18, 2008.
US Office Action, U.S. Appl. No. 11/197,864 dated Feb. 19, 2009.
US Office Action, U.S. Appl. No. 11/197,864 dated Jun. 5, 2009.
Notice of Allowance from U.S. Appl. No. 10/872,103 dated Sep. 15, 2008.
Office communication from U.S. Appl. No. 11/197,864 dated Oct. 09, 2009.
Decision on Appeal from U.S. Appl. No. 11/197,864 dated Oct. 18, 2010.
Notice of Abandonment from U.S. Appl. No. 11/197,864 dated Jan. 27, 2011.
Office action from Chinese Application No. 200580020171.X dated Oct. 27, 2010.
Office action from Chinese Application No. 200580020171.X dated Mar. 24, 2011.
Communication from European Application No. 07751796.9 dated Apr. 23, 2010.
Office action from Chinese Application No. 200580020171.X dated Jul. 19, 2010.
Office action from Chinese Application No. 200580020171.X dated Feb. 12, 2010.
Office action from Chinese Application No. 200780006861.9 dated Jul. 21, 2011.
Office action from Japanese Application No. 2007-516511 dated Aug. 23, 2011.
Office action from Canadian Application No. 2,569,055 dated Sep. 22, 2011.
Communication from European Application No. 05753082.6 dated Dec. 8, 2011.
Office action from Korean Application No. 2006-7026444 dated Dec. 23, 2011.
English explanation of relevant portions of Office action from Mexican Application No. 08/10915 dated Nov. 28, 2011.

* cited by examiner

SIZING FOR HIGH PERFORMANCE GLASS FIBERS AND COMPOSITE MATERIALS INCORPORATING SAME

CROSS REFERENCE TO RELATED APPLICATIONS

This application is a continuation-in-part of U.S. patent application Ser. No. 11/197,864 entitled "Epoxy Sizing Composition for Filament Winding" filed Aug. 5, 2005 (now abandoned), which is a continuation-in-part of U.S. patent application Ser. No. 10/872,103 entitled "Epoxy Sizing Composition For Filament Winding" filed Jun. 18, 2004 (now U.S. Pat. No. 7,465,764) the entire contents of these applications is expressly incorporated herein by reference.

TECHNICAL FIELD AND INDUSTRIAL APPLICABILITY OF THE INVENTION

The present invention relates generally to size compositions for glass fibers, and more particularly, to size compositions containing an epoxy emulsion and urethane for sizing glass fibers. The sized fibers are especially useful on fibers that will undergo a subsequent processing step such as knitting or weaving. The sized fibers especially suitable for use in reduced weight composite materials. Composite article including wind turbine blades and nacelles, aircraft interior and exterior parts, vehicle and infrastructure armor, transmission cable, automotive parts, high pressure tanks such as CNG/LNG tanks, high pressure pipe oil platform structures, electronic devices ceramic ware and heat resistant an filtration substrates formed from fibers sized with the sizing composition is also provided.

BACKGROUND OF THE INVENTION

Glass fibers are useful in a variety of technologies. For example, glass fibers are commonly used as reinforcements in polymer matrices to form glass fiber reinforced plastics or composites because they provide dimensional stability as they do not shrink or stretch in response to changing atmospheric conditions. In addition, glass fibers have high tensile strength, heat resistance, moisture resistance, and low thermal conductivity.

Typically, glass fibers are formed by attenuating streams of a molten glass material from a bushing or orifice. The molten glass may be attenuated by a winder which collects gathered filaments into a package or by rollers which pull the fibers before they are collected and chopped. An aqueous sizing composition is typically applied to the fibers after they are drawn from the bushing. Once the fibers are treated with the sizing composition, they may be dried in a package or chopped strand form. Drying the fibers evaporates the liquid medium and deposits the size as a residue lightly coating the surface of the glass fiber.

Conventional sizing compositions typically contain one or more film forming polymeric or resinous components, glass-resin coupling agents, and one or more lubricants dissolved or dispersed in a liquid medium. The film forming component of the size composition is desirably selected to be compatible with the matrix resin or resins in which the glass fibers are to be embedded. Epoxy resins and polyurethanes have been used as film forming components in size compositions. Epoxy resins are typically utilized where the fibers are to be used for reinforcing articles. Epoxy film formers are utilized in the sizing compositions of a wide variety of reinforcement systems for numerous resin systems by impregnating continuous multifilament glass fiber strands with a curable resin composition.

Recently Owens Corning (of Toledo, Ohio, USA) has developed High Performance (HP) glass that may be inexpensively formed into glass fiber using low-cost, direct melting in refractory-lined furnaces due to the relatively low fiberizing temperature. These HP fibers are disclosed in U.S. patent application Ser. No. 11/267,702 entitled "Composition For High Performance Glass" filed Nov. 5, 2005, the entire content of which is expressly incorporated herein by reference. Once formed into fibers, the glass composition provides the strength characteristics of higher-priced S-Glass fibers. The composition of the present invention is 60.5-70.5 weight % $SiO_2$, 10.0-24.5 weight % $Al_2O_3$, 6.0 to 20.0 weight % RO where RO equals the sum of MgO, CaO, SrO and BaO, and 0.0 to 3.0 weight % alkali metal oxides. In a preferred embodiment, the glass composition is substantially 61-68 weight % $SiO_2$, 15-19 weight % $Al_2O_3$, 15-20 weight % RO, 0 to 3 weight % $ZrO_2$, and 0 to 3 weight % alkali metal oxides.

Accordingly, in view of the dual role of the sizing compositions in improving the processability of the fibers while improving the physical properties of the resulting composite and the wide variety of polymeric materials that can be reinforced with glass fibers, a continuing need exists in the art for specifically tailored sizing compositions that provide enhanced physical properties and processing characteristics to reinforced composite articles.

SUMMARY OF THE INVENTION

It is an object of the present invention to provide a sizing composition for glass fibers that includes an epoxy resin emulsion, a urethane, a silane package that includes at least one aminosilane coupling agent and at least one epoxy silane coupling agent, a non-ionic lubricant, a cationic lubricant, an antistatic agent, an organic acid, and a boron-containing compound. The epoxy resin emulsion contains an epoxy resin and at least one surfactant. It is preferred that the epoxy resin have an epoxy equivalent weight from 180-210, and even more preferably from 180-195. Although the size composition may be applied to any glass fiber, the performance of the size is optimized when low-to-no boron-containing glass fibers are utilized.

Examples of suitable organic acids that may be used in the size composition include acetic acid, formic acid, succinic acid, and/or citric acid. Acetic acid is the most preferred organic acid for use in the size composition. Boric acid is the most preferred boron-containing compound. The size composition reduces drag and the level of fuzz that occurs on the glass fibers. In addition, the reduction in drag reduces the amount of size that is deposited onto the contact points from the glass fibers during processing. The sizing composition is advantageously employed to coat fibers used in filament winding applications.

It is another object of the present invention to provide a composite article that is formed of a plurality of glass fibers sized with a sizing composition that includes an epoxy resin emulsion, a urethane, a silane package that includes at least one aminosilane coupling agent and at least one epoxy silane coupling agent, a non-ionic lubricant, a cationic lubricant, an antistatic agent, an organic acid, and a boron-containing compound. The reinforced composite product made from fibers sized with the sizing composition demonstrate improved physical properties such as improved wet mechanical properties, improved strength, and superior processing characteristics such as faster impregnation of a glass strand by the epoxy resin, a low level of broken filaments, and improved mechanical properties of the composite part.

It is an advantage of the sizing composition that the low molecular weight epoxy resin emulsions present in the size composition are in a liquid form that reduces or eliminates the need for an organic solvent in the sizing composition. The reduction of organic solvents in the size in turn reduces the amount of volatile organic compounds (VOC's) that are emitted, thereby creating a safer, more environmentally friendly workplace.

It is an advantage of the sizing composition that the urethane provides improved properties of fibers when subjecting the fibers to a step of knitting or weaving prior to including the fibers in matrixes of organic polyester, vinylester, epoxy, polycarbonate, phenolic, urethane, cyanate ester, bismaleimide, polyimide, polyamide, copolyester, polyolefin, ABS and similar matrix resin systems. The sizing composition is applied to the fibers to improve the compatibility of the fibers with the matrix resin that is to be reinforced. In addition to improving the processability of the fiber and the fiber-polymer coupling, the sizing composition also enhances the physical properties of the composite article formed from the reinforced fiber. It is also an advantage of the present invention that the film forming emulsions are substantially color free and disperse easily in water.

It is also an advantage that the small amount of boron present in the size composition reduces the amount of boron present in the air and assists in making the size composition environmentally friendly.

It is also an advantage of the present invention that the size composition increases the integrity of the sizing on the fiber to provide an enhanced physical properties in a subsequent mechanical step such as weaving or knitting.

It is also an advantage of the present invention that the size composition reduces the friction generated between the contact points and the sized glass fibers (drag) in the manufacturing process and the thus reduces the level of fuzz on the glass fibers.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. It is to be noted that the phrases "size composition", "sizing composition", "size", and "sizing" are used interchangeably herein.

The present invention relates to improved sizing compositions for fibers that may be advantageously used with high performance fibers in wind turbine blades and nacelles, aircraft interior and exterior parts, vehicle and infrastructure armor, transmission cable, automotive parts, high pressure tanks such as CNG/LNG tanks, high pressure pipe oil platform structures, electronic devices ceramic ware and heat resistant an filtration substrates. The sizing composition includes an epoxy film former, a urethane, a silane package that includes an aminosilane coupling agent and an epoxy silane coupling agent, a cationic lubricant, a non-ionic lubricant, an antistatic agent, and at least one acid. In addition, the sizing composition may also contain a polyurethane or epoxy/polyurethane film former.

The epoxy film forming polymer component of the sizing composition includes epoxy resin emulsions that contain a low molecular weight epoxy resin and at least one surfactant. The film former functions to protect the fibers from damage during processing and imparts compatibility of the fibers with the matrix resin. It is preferred that the epoxy resin have a molecular weight from 360-420 and an epoxy equivalent weight from 180-210, more preferably a molecular weight 360-390 and an epoxy equivalent weight from 180-195, and most preferably a molecular weight of 370-384 and an epoxy equivalent weight from 185-192. "Epoxy equivalent weight", as used herein, is defined by the molecular weight of the epoxy resin divided by the number of epoxy groups present in the compound. Useful epoxy resins contain at least one epoxy or oxirane group in the molecule, such as polyglycidyl ethers of polyhydric alcohols or thiols. Examples of suitable epoxy film forming resins include Epon® 828 (available from Hexion Specialties Chemicals Incorporated), DER 331 (available from Dow Chemicals), Araldite 6010 (available from Huntsman), and Epotuf 37-140 (available from Reichhold Chemical Co).

The low molecular weight epoxy resin emulsions are in a liquid form which reduces, and in some cases, eliminates the need for a solvent such as diacetone alcohol. This reduction of organic solvents in turn reduces the amount of VOC's (volatile organic compounds) that are emitted into the working environment. In addition, the low molecular weight epoxy film forming emulsions according to the present invention are substantially color free. As used herein, the term "substantially color free" means that there is minimal or no coloration of the epoxy emulsions. Another advantage of the inventive epoxy emulsions is that they disperse easily in water. The inventive epoxy resins also provide for better wetting of the resin, a greater epoxy reactivity, improved coating quality, improved emulsion dispersion, and reduced strand stiffness.

Examples of suitable surfactants for use in the epoxy resin emulsion include, but are not limited to, Triton X-100, an octylphenoxypolyethoxyethanol (available from Union Carbide Corp.), Pluronic P103, an ethylene oxide/propylene oxide block copolymer (available from BASF), Pluronic F77, an ethylene oxide/propylene oxide block copolymer (available from BASF), Pluronic 10R5, an ethylene oxide/propylene oxide block copolymer (available from BASF), a block copolymer of ethylene oxide and propylene oxide such as Pluronic L101 (available from BASF), a polyoxyethylene-polyoxypropylene block copolymer such as Pluronic P105 (available from BASF), and an ethylene oxide/propylene oxide copolymer (available from BASF). Preferably, the epoxy resin emulsion contains two or more surfactants. In a preferred embodiment, a combination of (1) a block copolymer of ethylene oxide and propylene oxide and (2) a polyoxyethylene-polyoxypropylene block copolymer (such as Pluronic L101 and Pluronic P105) is used in the epoxy resin emulsion. The surfactant or surfactants may be present in the epoxy resin emulsion in an amount from 10-25%, and most preferably in an amount of 18%.

The epoxy resin emulsion is present in the size composition in an amount from about 60 to about 90% by weight solids and preferably from about 70-80% by weight solids.

A comparison of the theoretical percent solids on strand based on uniform pickup in conventional binders and an inventive binders is set forth in Table 1.

TABLE 1

| MATERIAL | EX. 1<br>107B | EX. 2<br>111A | EX. 3<br>158B | EX. 4<br>SE1200 | EX. 5<br>SE2350 | EX. 6<br>SE2350<br>mod2 | EX. 7<br>SE2350<br>mod3 | 193 | 973 |
|---|---|---|---|---|---|---|---|---|---|
| PE-412 | | | | | | | | | 55.8% |
| 25-2828 | | | | | | | | | 32.9% |
| EE732 | | | | | | | | | 9.8% |
| AD-501 | 75.51% | | | | | | | | |
| AD-502 | | 65.96% | 68.17% | 65.88% | | | | | |
| Epirez 3511 W60 | | | | | 76.2% | 71.1% | 64.1% | | |
| Hydrosize U6-01 | | | | | | 5.0% | 5.2% | | |
| A-174 | 7.23% | 4.37% | | 6.30% | | | 6.3% | | |
| A-1100 | 1.01% | | | | 0.63% | 0.63% | 0.64% | | 1.2% |
| A-187 | | 4.56% | 8.28% | 4.56% | 13.8% | 13.8% | 14.0% | | |
| Z6026 | | | | | | | | 58.4% | |
| A-1387 | | | | | | | | 41.6% | |
| Citric Acid | 3.45% | | 0.57% | | | | | | |
| Emery 6760 | 0.75% | 1.69% | 1.54% | 0.70% | 0.05% | 0.12% | 0.2% | | 0.3% |
| PEG 400 MO | 9.75% | 21.67% | 19.77% | 21.01% | | | | | |
| PEG 200 ML | | | | | 8.1% | 8.0% | 8.2% | | |
| PVP-K90 | 2.30% | | | | | | | | |
| Mono PE | | 1.76% | 1.67% | 0.44% | | | | | |
| Emerstat 6660A | | | | 1.10% | 0.6% | 0.7% | 0.6% | | |
| Boric acid | | | | | 0.6% | 0.6% | 0.6% | | |
| TOTAL | 100.00% | 100.00% | 100.00% | 100.00% | 100.00% | 100.00% | 100.00% | 100% | 100% |

TABLE 2

(Physical Test Data)

| | | 13722<br>Advantex | SE1200<br>Advantex | R25H<br>Advantex | SE1200<br>HP glass | SE2350<br>M2<br>HP glass | 13740<br>HP glass | 377M<br>HP glass | SE2350<br>M3<br>HP glass |
|---|---|---|---|---|---|---|---|---|---|
| TEX | (gr/km) | 1244 | 1212 | 1143 | 1202 | 1200 | 1164 | 1162 | 1200 |
| H$_2$O | (%) | 0.0092 | 0.0091 | 0.0083 | 0.0067 | 0.0075 | 0.0073 | 0.0121 | 0.0075 |
| LOI | (%) | 0.4759 | 0.5234 | 0.3805 | 0.6397 | 0.6072 | 0.4721 | 0.6538 | 0.4700 |

TABLE 3

(Flexion Data - Epoxy)

| | | 13722<br>Advantex | SE1200<br>Advantex | R25H<br>Advantex | SE1200<br>HP glass | SE2350<br>M2<br>HP glass | 13740<br>HP glass | 377M<br>HP glass | SE2350<br>M3<br>HP glass |
|---|---|---|---|---|---|---|---|---|---|
| Glass content | (%) | 70.02 | 65.61 | 63.52 | 66.16 | 67.4 | 64.69 | 64.91 | 66.74 |
| Strength | (Mpa) | 1234 | 1206 | 1130 | 1334 | 1362 | 1271 | 1251 | 1246 |
| Stength 65% | (Mpa) | 1110 | 1192 | 1163 | 1303 | 1297 | 1279 | 1253 | 1203 |
| Modulus | (Mpa) | 34187 | 33691 | 29191 | 36636 | 36928 | 34905 | 33950 | 36502 |
| Modulus 65% | (Mpa) | 30755 | 33280 | 30055 | 35786 | 35155 | 35122 | 34012 | 35232 |

TABLE 4

(Flexion Data - Polyester)

| | | 13722 Advantex | SE1200 Advantex | R25H Advantex | SE1200 HP glass | SE2350 M2 HP glass | 13740 HP glass | 377M HP glass | SE2350 M3 HP glass |
|---|---|---|---|---|---|---|---|---|---|
| Glass content | (%) | 67.15 | 66.85 | 63.37 | 66.65 | 65.65 | 64.49 | 64.47 | 66.91 |
| Strength | (Mpa) | 1432 | 1526 | 1461 | 1578 | 1435 | 1487 | 1419 | 1574 |
| Stength 65% | (Mpa) | 1371 | 1470 | 1509 | 1526 | 1416 | 1503 | 1434 | 1514 |
| Modulus | (Mpa) | 36829 | 34441 | 29759 | 34112 | 32280 | 31616 | 28773 | 34611 |
| Modulus 65% | (Mpa) | 35245 | 33166 | 30729 | 32986 | 31861 | 31939 | 29078 | 33289 |

TABLE 5

(Short Beam Data - Epoxy)

| | | 13722 Advantex | SE1200 Advantex | R25H Advantex | SE1200 HP glass | SE2350 M2 HP glass | 13740 HP glass | 377M HP glass | SE2350 M3 HP glass |
|---|---|---|---|---|---|---|---|---|---|
| Glass content | (%) | 61.37 | 61.59 | 59.52 | 64.34 | 62.71 | 60.17 | 62.33 | 63.75 |
| Strength | (Mpa) | 52.9 | 46.9 | 43.0 | 52.9 | 53.9 | 50.5 | 54.0 | 51.6 |
| Stength 65% | (Mpa) | 56.8 | 50.1 | 47.7 | 53.6 | 56.4 | 55.4 | 56.9 | 52.9 |

TABLE 6

(Short Beam Data - Polyester)

| | | | | | | | | | |
|---|---|---|---|---|---|---|---|---|---|
| Glass content | (%) | 65.59 | 63.24 | 56.41 | 59.37 | 58.06 | 66.71 | 63.63 | 60.12 |
| Strength | (Mpa) | 43.2 | 52.8 | 46.5 | 53.1 | 45.1 | 47.5 | 50.3 | 50.4 |
| Stength 65% | (Mpa) | 42.7 | 54.6 | 54.5 | 59.1 | 51.3 | 45.9 | 51.7 | 55.4 |

TABLE 7

(Compression Data - Epoxy)

| | | 13722 Advantex | SE1200 Advantex | R25H Advantex | SE1200 HP glass | SE2350 M2 HP glass | 13740 HP glass | 377M HP glass | SE2350 M3 HP glass |
|---|---|---|---|---|---|---|---|---|---|
| Glass content | (%) | 67.42 | 64.63 | 69.76 | 65.75 | 66.00 | 65.20 | 64.75 | 66.68 |
| Strength | (Mpa) | 537.37 | 565.34 | 704.03 | 566 | 525.31 | 539.39 | 665.67 | 637.21 |
| Stength 65% | (Mpa) | 511.3 | 569.5 | 637.0 | 557.5 | 514.8 | 537.3 | 669.0 | 615.8 |

TABLE 8

(Compression Data - Polyester)

| | | Glass Type | | | | | | | |
|---|---|---|---|---|---|---|---|---|---|
| | | 13722 Advantex | SE1200 Advantex | R25H Advantex | SE1200 HP | SE2350 M2 HP | 13740 HP | 377M HP | SE2350 M3 HP |
| Glass content | (%) | 65.45 | 64.76 | 63.86 | 66.42 | 66.19 | 67.30 | 64.98 | 67.09 |
| Strength | (Mpa) | 740.28 | 792.3 | 683.47 | 791.9 | 536.81 | 712.53 | 760.44 | 778.72 |
| Stength 65% | (Mpa) | 733.6 | 796.1 | 699.1 | 769.4 | 524.0 | 679.7 | 760.7 | 746.2 |

The HP glasses are made from a range of glass compositions, as shown in the examples listed in Tables 9A-9C, which were melted in platinum crucibles or in a continuous platinum-lined melter for the purpose of determining the mechanical and physical properties of the glass and fibers produced therefrom. The fibers used to generate the data of Table 1-8 are shown in EX. 14. The units of measurement for the physical properties are: Viscosity (° F.), Liquidus temperature (° F.) and ΔT (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The temperature of the fiberizing viscosity in this invention was measured using a rotating spindle viscometer. The fiberizing viscosity is defined as 1000 Poise. The liquidus in this invention was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600 degrees C. The softening point temperature was measured using the ASTM C338 fiber-elongation method.

TABLE 9A

| | Glass | | | | | |
|---|---|---|---|---|---|---|
| | Ex. 1 | Ex. 2 | Ex. 3 | Ex. 4 | Ex. 5 | Ex. 6 |
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |
| $Na_2O$ | 0.70 | 0.69 | | 0.70 | 0.70 | |
| $TiO_2$ | 0.00 | 0.01 | 0.01 | 0.00 | 0.01 | 0.02 |
| $Fe_2O_3$ | 0.20 | 0.05 | 0.045 | 0.20 | 0.05 | 0.037 |
| Measured Viscosity (° F.) | 2491 | na | na | 2514 | na | na |
| Measured Liquidus (° F.) | 2261 | 2247 | na | 2335 | na | na |
| Measured DT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | $2.28 \times 10^{-6}$ | na | na |

TABLE 9B

| | Glass | | | | | |
|---|---|---|---|---|---|---|
| | Ex. 7 | Ex. 8 | Ex. 9 | Ex. 10 | Ex. 11 | Ex. 12 |
| $SiO_2$ | 62.32 | 63.89 | 63.14 | 61.39 | 61.39 | 65.00 |
| CaO | 11.56 | 11.21 | 11.96 | 11.96 | 8.71 | 13.00 |
| $Al_2O_3$ | 17.25 | 16.39 | 16.39 | 18.14 | 18.89 | 15.00 |
| MgO | 7.98 | 6.62 | 6.62 | 6.62 | 9.62 | 5.00 |
| $Na_2O$ | 0.70 | 0.75 | 0.75 | 0.75 | 0.25 | 1.00 |
| $TiO_2$ | 0.00 | 0.75 | 0.75 | 0.75 | 0.75 | 1.00 |
| $Fe_2O_3$ | 0.20 | 0.39 | 0.39 | 0.39 | 0.39 | |
| Measured | 2458 | 2493 | 2435 | 2431 | 2434 | 2509 |

TABLE 9B-continued

| | Glass | | | | | |
|---|---|---|---|---|---|---|
| | Ex. 7 | Ex. 8 | Ex. 9 | Ex. 10 | Ex. 11 | Ex. 12 |
| Viscosity (° F.) | | | | | | |
| Measured Liquidus (° F.) | 2301 | 2268 | 2294 | 2353 | 2261 | 2226 |
| Measured DT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/(° F.) | $2.77 \times 10^{-6}$ | na | na | na | na | na |

TABLE 9C

| | Glass | | | | | |
|---|---|---|---|---|---|---|
| | Ex. 13 | Ex. 14 | Ex. 15 | Ex. 16 | Ex. 17 | Ex. 18 |
| $SiO_2$ | 63.89 | 62.16 | 64.00 | 63.89 | 65.00 | 65.00 |
| CaO | 6.96 | 8.03 | 4.00 | 8.96 | 14.00 | 12.50 |
| $Al_2O_3$ | 18.64 | 19.12 | 20.00 | 18.89 | 15.00 | 15.00 |
| MgO | 9.62 | 9.69 | 11.00 | 6.62 | 5.00 | 5.00 |
| $Na_2O$ | 0.25 | 1.00 | 1.00 | 0.75 | 0.00 | 1.00 |
| $TiO_2$ | 0.25 | 0.00 | 0.00 | 0.75 | 1.00 | 1.00 |
| $Fe_2O_3$ | 0.39 | 0.00 | 0.00 | 0.14 | 0.00 | 0.50 |
| Measured Viscosity (° F.) | 2513 | 2510 | 2548 | 2565 | 2481 | 2523 |
| Measured Liquidus (° F.) | 2337 | 2320 | 2401 | 2288 | 2403 | 2227 |
| Measured DT (° F.) | 176 | 190 | 147 | 277 | 78 | 296 |
| Measured Strength (KPsi) | 695 | 654 | na | na | 604 | na |
| Measured Density (g/cc) | 2.480 | na | na | na | 2.546 | na |
| Measured Modulus (MPsi) | 12.3 | na | na | na | 11.9 | na |
| Softening Point (° F.) | na | na | na | na | na | na |
| CTE in/in/(° F.) | na | na | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

The silane package utilized in the size composition includes an at least one aminosilane coupling agent and at least one epoxy silane coupling agent. The coupling agents used in the silane package of the size composition may have hydrolyzable groups that can react with the glass surface to remove unwanted hydroxyl groups and one or more groups that can react with the film-forming polymer to chemically link the polymer with the glass surface. In particular, the coupling agents preferably include 1-3 hydrolyzable functional groups that can interact with the surface of the glass fibers and one or more organic groups that are compatible with the polymer matrix.

Suitable coupling agents for use in the silane package have a readily hydrolyzable bond to a silicon atom of the silane, or hydrolysis products thereof. Silane coupling agents which may be used in the present size composition may be characterized by the functional groups amino, epoxy, azido, vinyl, methacryloxy, ureido, and isocyanato. In addition, the coupling agents may include an acrylyl or methacrylyl group linked through non-hydrolyzable bonds to a silicon atom of the silane.

Coupling agents for use in the silane package include monosilanes containing the structure $Si(OR)_2$, where R is an organic group such as an alkyl group. Lower alkyl groups such as methyl, ethyl, and isopropyl are preferred. Silane coupling agents function to enhance the adhesion of the film forming agent to the glass fibers and to reduce the level of fuzz, or broken fiber filaments, during subsequent processing. Examples of suitable aminosilane coupling agents for use in the silane package include, but are not limited to aminopropyltriethoxysilane (A-1100 from GE Silicones), N-β-aminoethyl-γ-aminopropyltrimethoxysilane (A-1120 from GE Silicones), N-phenyl-γ-aminopropyltrimethoxysilane (Y-9669 from GE Silicones), and bis-γ-trimethoxysilylpropylamine (A-1170 from GE Silicones). Preferably, the aminosilane coupling agent is aminopropyltriethoxysilane (A-1100 from GE Silicones). The amino silane coupling agent may be present in the size composition in an amount from 0.4-0.8% by weight solids, preferably in an amount from 0.4-0.6% by weight solids. Although not wishing to be bound by theory, it is believed that the presence of a minimal amount of aminosilane coupling agent in the inventive sizing composition improves the mechanical properties of the final product. Too much aminosilane coupling agent added to the sizing composition may deteriorate mechanical properties.

Non-limiting examples of suitable epoxy silane coupling agents include a glycidoxy polymethylenetrialkoxysilane such as 3-glycidoxy-1-propyl-trimethoxysilane, an acryloxy or methacrylyloxypolymethylenetrialkoysilane such as 3-methacrylyloxy-1-propyltrimethoxysilane, γ-glycidoxypropyltrimethoxysilane (A-187 available from GE Silicones), γ-methacryloxypropyltrimethoxysilane (A-174 available from GE Silicones), α-chloropropyltrimethoxysilane (KBM-703 available from Shin-Etsu Chemical Co., Ltd.), α-glycidoxypropylmethyldiethoxysilane (A-2287 available from GE Silicones), and vinyl-tris-(2-methoxyethoxy)silane (A-172 from available GE Silicones). In at least one preferred embodiment, the epoxy silane coupling agent is γ-glycidoxypropyltrimethoxysilane (A-187) described above. The use of methacryloxy silanes such as A-174 improves the compatability of the sized fibers with vinyl ester and polyester resins. The epoxy silane coupling agent may be present in the size composition in an amount from 10-20% by weight solids, preferably from 10-16% by weight solids, and even more preferably from 10-14% by weight solids.

Additionally, the sizing composition contains at least one non-ionic lubricant. The non-ionic lubricant in the sizing composition acts as a "wet lubricant" and provides additional protection to the fibers during the filament winding process. In addition, the non-ionic lubricant helps to reduce the occurrence of fuzz. Especially suitable examples of non-ionic lubricants include PEG 200 Monolaurate (a polyethylene glycol fatty acid ester commercially available from Cognis) and PEG 600 Monooleate (Cognis). Other non-limiting examples include a polyalkylene glycol fatty acid such as PEG 600 Monostearate (a polyethylene glycol monostearate available from Cognis), PEG 400 Monostearate (Cognis), PEG 400 Monooleate (Cognis), and PEG 600 Monolaurate (Cognis). In a most preferred embodiment, the non-ionic lubricant is PEG 200 Monolaurate. The non-ionic lubricant may be present in the size composition in an amount from approximately 6-10% by weight solids, preferably from 7-9% by weight solids.

In addition to the non-ionic lubricant, the sizing composition also contains at least one cationic lubricant and at least one antistatic agent. The cationic lubricant aids in the reduction of interfilament abrasion. Suitable examples of cationic lubricants include, but are not limited to, a polyethyleneimine polyamide salt commercially available from Cognis under the trade name Emery 6760L, a stearic ethanolamide such as Lubesize K-12 (AOC), Cirrasol 185AE (Unichemie), and Cirrasol 185AN (Unichemie). The amount of cationic lubricant present in the size composition is preferably an amount sufficient to provide a level of the active lubricant that will form a coating with low fuzz development. In at least one exemplary embodiment, the cationic lubricant is present in the size composition in an amount from 0.01-1.0% by weight solids, preferably from 0.03-0.06% by weight solids. Antistatic agents especially suitable for use herein include antistatic agents that are soluble in the sizing composition. Examples of suitable antistatic agents include compounds such as Emerstat™ 6660A and Emerstat™ 6665 (quaternary ammonium antistatic agents available from Emery Industries, Inc.), and Larostat 264A (a quaternary ammonium antistatic agent available from BASF), tetraethylammonium chloride, and lithium chloride. Antistatic agents may be present in the size composition in an amount from 0.4-0.8% by weight solids, preferably from 0.4-0.6% by weight solids.

The total amount of the cationic lubricant and the antistatic agent that is present in the size composition may range from 0.4-0.8% by weight solids, preferably from 0.4-0.7% by weight solids. It is preferred, however, that the amount of cationic lubricant and antistatic agent present in the size composition is an amount that is less than or equal to approximately 1.0% by weight solids.

Further, the sizing composition may contain a small amount of at least one weak organic acid. Although not wishing to be bound by theory, it is believed that citric acid, a conventional acid additive for sizing compositions used to adjust the pH, may prematurely open the epoxy groups in the film formers and epoxy silanes if used in large amounts during the drying of the glass fibers, which may result in a reduction of mechanical properties. In the inventive size composition, a trace amount of acetic acid, formic acid, succinic acid, and/or citric acid may be added to the inventive sizing composition to hydrolyze the silane in the coupling agent without prematurely opening the epoxy groups. It is preferred that the organic acid is acetic acid. In especially preferred embodiments, the organic acid (such as acetic acid) is present in the size composition in an amount from 0.4-1.0% by weight solids, preferably from 0.5-0.7% by weight solids.

In addition, the size composition contains a boron-containing compound that is capable of providing boron atoms to the size composition. It is hypothesized that the boron atoms released from the boron-containing compound act with the aminosilane at the glass interface to assist in adhering the remaining sizing components to the glass fiber. In addition, it has been discovered that the combination of a boron containing compound such as boric acid in the size composition, together with an aminosilane (e.g., A-1100), and an epoxy silane (e.g., A-187), improves the mechanical properties of the final product. Non-limiting examples of suitable boron-containing compounds include boric acid and borate salts such as boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate, and zinc tetrafluoroborate. Preferably, the boron-containing compound is boric acid. The boron-containing compound is present in the sizing composition in an amount from 0.2-3.0% by weight solids, preferably from 0.2-1.0% by weight solids, and most preferably from 0.2-0.6% by weight solids.

The combination of the organic acid (e.g., acetic acid) and boric acid in the size composition desirably imparts a pH from 3.0-7.0, and more preferably a pH from 3.5-5.5 to the size composition.

Optionally, the size composition may contain a polyurethane film former such as Baybond 2297 (Bayer), Baybond PU403 (Bayer), and W-290H (Chemtura) or an epoxy/polyurethane film former such as Epi-Rez 5520-W-60 (Hexion Specialties Chemicals Incorporated).

EPI-REZ Resin 3510-W-60, an aqueous dispersion of a low molecular weight liquid Bisphenol A epoxy resin (EPON™ Resin 828-type); EPI-REZ Resin 3515-W-60, an aqueous dispersion of a semi-solid Bisphenol A epoxy resin; EPI-REZ Resin 3519-W-50, an aqueous dispersion of a CTBN (butadiene-acrylonitrile) modified epoxy resin; EPI-REZ Resin 3520-WY-55, an aqueous dispersion of a semi-solid Bisphenol A epoxy resin (EPON 1001-type) with an organic co-solvent; EPI-REZ Resin 3521-WY-53, a lower viscosity version of the EPI-REZ Resin 3520-WY-55 dispersion; EPI-REZ Resin 3522-W-60, an aqueous dispersion of a solid Bisphenol A epoxy resin (EPON 1002-type); EPI-REZ Resin 3535-WY-50; an aqueous dispersion of a solid Bisphenol A epoxy resin (EPON 1004-type) with an organic co-solvent; EPI-REZ Resin 3540-WY-55, an aqueous dispersion of a solid Bisphenol A epoxy resin (EPON 1007-type) with an organic co-solvent; EPI-REZ Resin 3546-WH-53, an aqueous dispersion of a solid Bisphenol A epoxy resin (EPON 1007-type) with a non HAPS co-solvent; EPI-REZ Resin 5003-W-55, an aqueous dispersion of an epoxidized Bisphenol A novolac resin with an average functionality of 3 (EPON SU-3 type); EPI-REZ Resin 5520-W-60, an aqueous dispersion of a urethane-modified Bisphenol A epoxy resin; EPI-REZ Resin 5522-WY-55, an aqueous dispersion of a modified Bisphenol A epoxy resin (EPON 1002-type) with an organic co-solvent; EPI-REZ Resin 6006-W-70, an aqueous dispersion of a epoxidized o-cresylic novolac resin with an average functionality of 6, each of which is commercially available from Resolution Performance Products.

The polyurethane film former increases strand integrity and the mechanical fatigue performance by toughening the resin/size interphase. The toughened resin interphase results in a final composite product that has an improved resistance to cracking and has increased or improved mechanical properties such as improved strength. The urethane film former may be present in the sizing composition an amount from about 2 to about 10% by weight solids, preferably in an amount from 2.5-7.5% by weight solids and most preferably of about 5.1% by weight solids. Suitable polyurethane dispersions include polyurethane emulsions such as Hydrosize® U1-01, U1-03, U2-01, U4-01, U5-01, U6-01, U6-03 and U7-01 available from Hydrosize® Technologies, Inc (Raleigh, N.C., USA)

The size composition further includes water to dissolve or disperse the active solids for coating. Water may be added in amounts sufficient to dilute the aqueous sizing composition to a viscosity that is suitable for its application to glass fibers and to achieve the desired solids content on the fibers. The mix solids content of the size may be from about 1.0 to about 15%, preferably from about 5 to about 10%, and most preferably from about 8.0 to about 8.5%. In preferred embodiments, the sizing composition may contain up to approximately 92% water.

The range of components utilized in the sizing composition is set forth in Table 10.

TABLE 10

| Sizing Component | % by Weight Solids |
| --- | --- |
| Epoxy Resin Emulsion | 60-90 |
| Aminosilane Coupling Agent | 0.4-0.8 |
| Urethane Film Former | 2-10 |
| Epoxy Silane Coupling Agent | 10-20 |
| Non-Ionic Lubricant | 6-10 |

TABLE 10-continued

| Sizing Component | % by Weight Solids |
| --- | --- |
| Cationic Lubricant/Antistatic Agent | 0.4-0.8 |
| Acetic Acid | 0.4-1.0 |
| Boric Acid | 0.2-3.0 |
| Polyurethane or Epoxy/Polyurethane Film Former | 0-10 |
| Water | balance |

A preferred aqueous sizing composition according to the present invention is set forth in Table 11.

TABLE 11

| Sizing Component | % by Weight Solids |
| --- | --- |
| Epoxy Resin Emulsion | 70-80 |
| Urethane Film Former | 2.5-7.5 |
| Aminosilane Coupling Agent | 0.4-0.6 |
| Epoxy Silane Coupling Agent | 10-14 |
| Non-Ionic Lubricant | 7-9 |
| Cationic Lubricant/Antistatic Agent | 0.4-0.7 |
| Acetic Acid | 0.5-0.7 |
| Boric Acid | 0.2-1.0 |
| Polyurethane Film Former | 0-5 |
| Water | balance |

The size composition may be made by adding water, acetic acid, and an aminosilane coupling agent to a main mix container with agitation. The pH is adjusted with additional acetic acid to a pH of less than 5.5 if necessary. Once a pH of less than 5.5 is achieved, an epoxy silane coupling agent is added to the main mix container and the mixture is agitated to hydrolyze the silane coupling agents. Once the silane hydrolysis is complete, a pre-mix containing the epoxy resin emulsion, urethane, the non-ionic lubricant, and water is added to the main mix container. The cationic lubricant, the antistatic agent, and the boric acid are then separately added with agitation. If necessary, the main mixture is adjusted to a final pH level of approximately 3.0-7.0.

The size composition may be applied to strands of glass formed by conventional techniques such as by drawing molten glass through a heated bushing to form substantially continuous glass fibers. Any type of glass, such as A-type glass, C-type glass, E-type glass, S-type glass, R-type glass, AR-type glass, E-CR-type glass (commercially available from Owens Corning Fiberglass Corporation under the trade name Advantex®), or modifications thereof may be used. Although any glass fiber may be utilized, the size performance is optimized when High Performance (HP) glass fibers are used. The size composition may be applied to fibers having a diameter from about 5 to about 30 microns, with fibers from about 9 to about 30 microns in diameter being more preferred. For use in wind blade applications, the preferred diameter is between about 12 and 19 microns and 400 to 8000 tex. In addition, the size composition may be applied to single or multi-filament fiber strands. Each strand may contain from approximately 2000-4000 fibers.

The sizing composition may be applied to the fibers in any conventional manner using any conventional application technique such as by spraying or drawing the fibers to be sized across a rotating or stationary roll wet with the sizing composition. It is desirable to have as low a moisture content in the size composition as possible to reduce the migration of the size to the outside of the final dry package. The size composition may be applied to the fibers in an amount sufficient to provide the fibers and the final wet package with a moisture content from about 3% by weight to about 15% by weight. However, it is preferred that the size composition is applied such that that percent forming moisture of the final wet package has a moisture content from approximately 5-10% by weight, preferably from approximately 5-8% by weight, and most preferably from about 5-6% by weight. By reducing the amount of water in the size composition and therefore in the final wet package, migration that may occur in the final package is reduced or eliminated. Thus, the amount of the external portion of the package that would have to be removed as waste as a result of size migration is reduced or eliminated by utilizing the inventive sizing composition.

The size composition is preferably applied to the glass fibers and dried such that the size is present on the fibers in an amount from about 0.3 to about 1.25 percent by weight based on the total weight of the fibers. This can be determined by the loss on ignition (LOI) of the fiber, which is the reduction in weight experienced by the fibers after heating them to a temperature sufficient to burn or pyrolyze the organic size from the fibers.

The sizing composition is advantageously employed to coat the fibers used in a fabric by a knitting or weaving application. For example, the fibers may be coated or treated with the sizing composition and formed into a fabric in a conventional manner. The sized roving may then be formed into wind turbine blades and nacelles, aircraft interior and exterior parts, vehicle and infrastructure armor, transmission cable, automotive parts, high pressure tanks such as CNG/LNG tanks, high pressure pipe oil platform structures, electronic devices ceramic ware and heat resistant an filtration substrates. The resulting composite parts are heated, to cure the resin and cooled. Composite parts made from fibers sized with the size composition demonstrate superior strength and superior processing characteristics such as faster impregnation of the strand with the epoxy resin, a low level of broken filaments, and a smoother surface of the part.

Having generally described this invention, a further understanding can be obtained by reference to certain specific examples illustrated below which are provided for purposes of illustration only and are not intended to be all inclusive or limiting unless otherwise specified.

EXAMPLES

Rods were pultruded with epoxy MGS LI 35i resin (+137i hardener) and with Polyester Reichhold 513-575 (limited distribution to LM) and with Advantex and HP-glass, 17-1200 tex rovings. The rods were submitted to 3-point bending tests and Short Beam Shear Strength (SBSS) tests following ISO 3597-2 and ISO 3597-4 respectively.

The fibers were 17-1200 tex (nominal) with the Advantex fibers being 13722 (NG-T30-Wind Energy), available from Ownens Corning and HP-glass fibers which are not yet commercially available in the 377M, SE1200, SE2350-M2, SE2350-M3 sizings. Although nominal tex was identical for all products (1200 tex), effective differences in tex lead to glass contents ranging from 64.7% to 67.4% for HP-glass and from 63.5% to 70.0% for Advantex glass. A correct comparison between the 2 glasses must therefore take these differences into account.

Figure 1:
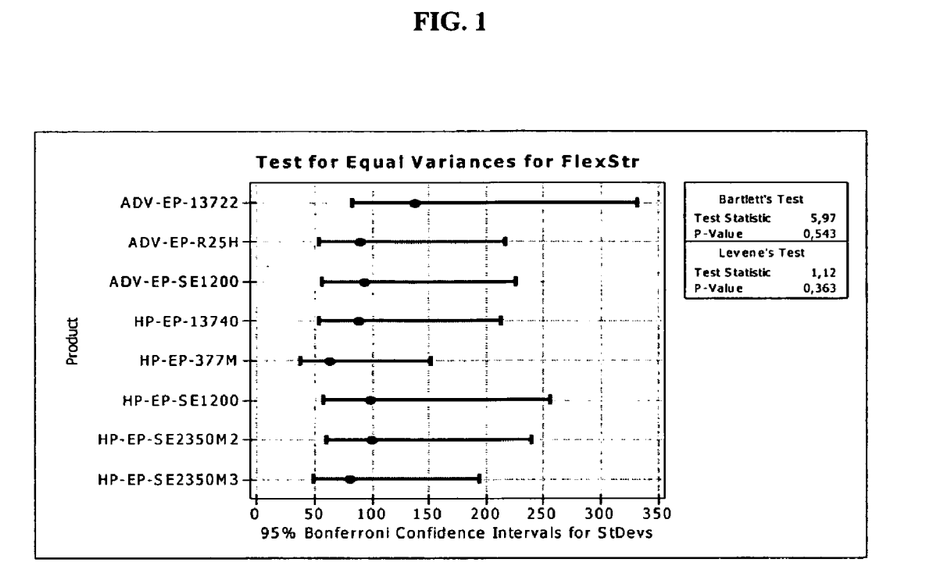
FIG. 1 is a bar chart showing testing for equal variances for flexural strength.
Figure 2:
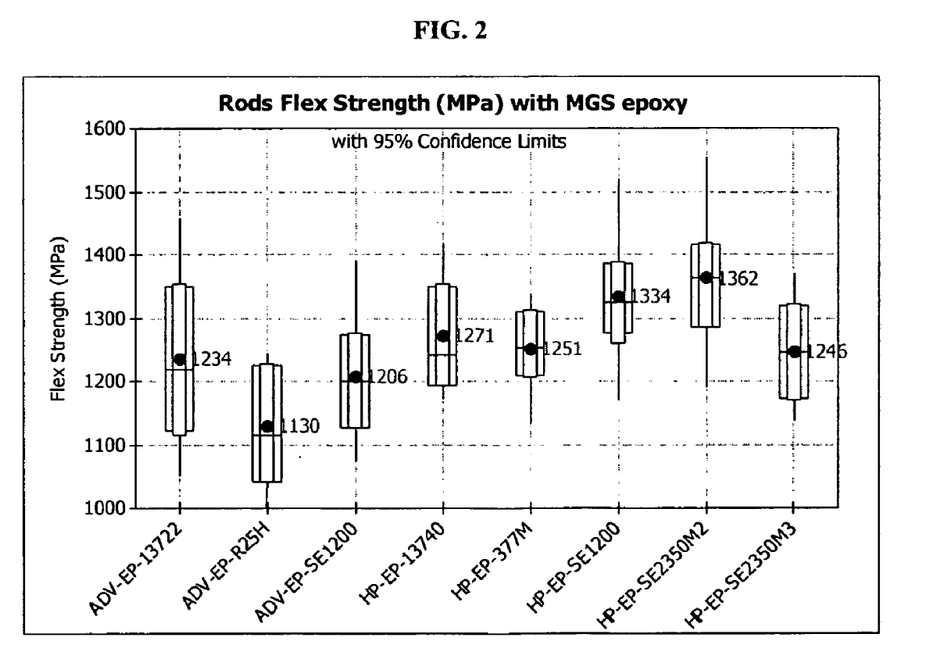
FIG. 2 is a bar chart showing rod flex strength in MPa of with reinforced rods made with MGS epoxy.
Figure 3:
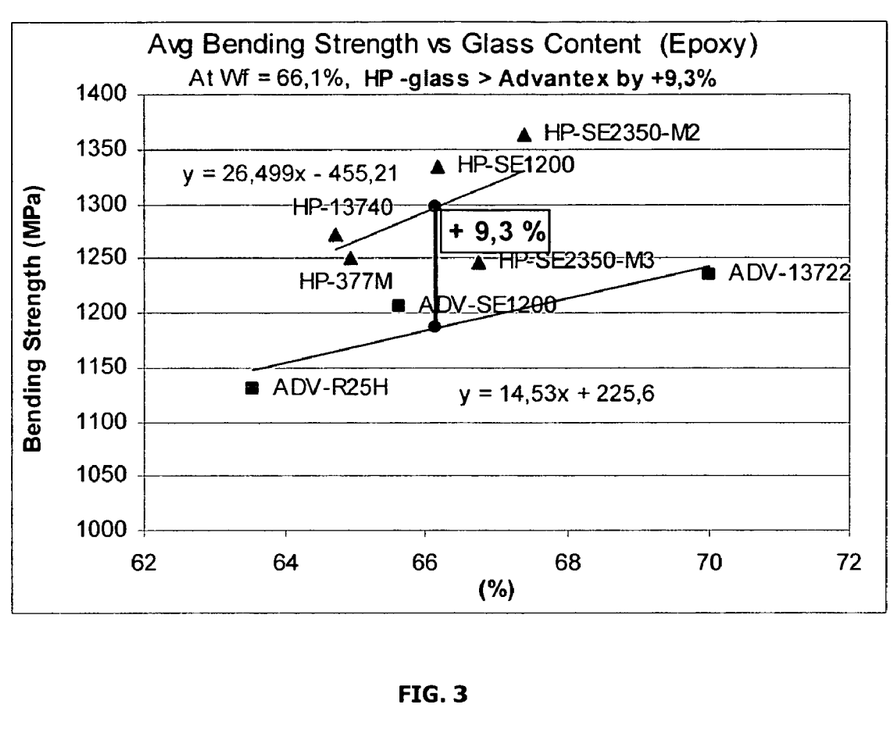
FIG. 3 is a graph showing average bending strength v. glass content for HP and Advantex reinforced epoxy rods.

For every product, the average bending strength is plotted against glass content (in wgt), and regression lines of strength versus glass content are drawn for both HP-glass and Advantex. The equations of the regression lines are provided. At overall average glass content of 66.1% (wgt), HP-glass exhibits a Bending Strength that is 9.3% superior to Advantex.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An aqueous sizing composition comprising:
    60-90% by weight solids of an epoxy resin emulsion containing at least one surfactant and a liquid epoxy resin having an epoxy equivalent weight from 180-210;
    5-10% by weight solids of a polyurethane film former;
    a silane package including at least one aminosilane coupling agent and at least one epoxy silane coupling agent;
    a cationic lubricant;
    a non-ionic lubricant;
    an antistatic agent;
    at least one organic acid; and
    a boron-containing compound.

2. The aqueous sizing composition of claim 1, wherein said liquid epoxy resin epoxy equivalent weight is 185-192.

3. The aqueous sizing composition of claim 1, wherein said at least one aminosilane coupling agent is aminopropyltriethoxysilane, said at least one epoxy silane coupling agent is γ-glycidoxypropyltrimethoxysilane, and said boron containing compound is boric acid.

4. The aqueous sizing composition of claim 1, further comprising a methacryloxy silane.

5. The aqueous sizing composition of claim 1, wherein said at least one organic acid is selected from the group consisting of acetic acid, formic acid, succinic acid and citric acid.

6. The aqueous sizing composition of claim 5, wherein said boron-containing compound is selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate.

7. The aqueous sizing composition of claim 1, wherein said at least one aminosilane coupling agent is present in said sizing composition in an amount from 0.4-0.8% by weight solids, said at least one epoxy silane coupling agent is present in said sizing composition in an amount from 10-20% by weight solids, said non-ionic lubricant is present in said sizing composition in an amount from 6-10% by weight solids, said cationic lubricant is present in said sizing composition in an amount from 0.01-1.0% by weight solids, said antistatic agent is present in said sizing composition in an amount from 0.4-0.8% by weight solids, said at least one organic acid is present in said sizing composition in an amount from 0.4-1.0% by weight solids and said boron-containing compound is present in said sizing composition in an amount from 0.2-3.0% by weight solids.

8. A high strength glass fiber at least partially coated with a sizing composition comprising:
    60-90% by weight solids of an epoxy resin emulsion including a liquid epoxy resin having an epoxy equivalent weight from 180-210 and at least one surfactant;
    5-10% by weight solids of a polyurethane film former;
    a silane package containing at least one aminosilane coupling agent and at least one epoxy silane coupling agent;

a cationic lubricant;
a non-ionic lubricant;
an antistatic agent;
at least one organic acid; and
a boron-containing compound.

9. The glass fiber of claim 8, wherein said liquid epoxy resin has an epoxy equivalent weight from 185-192.

10. The glass fiber of claim 9, wherein said at least one aminosilane coupling agent is aminopropyltriethoxysilane, said at least one epoxy silane coupling agent is γ-glycidoxypropyltrimethoxysilane, and said boron containing compound is boric acid.

11. The glass fiber of claim 8, further comprising a methacryloxy silane.

12. The glass fiber of claim 8, wherein said at least one surfactant comprises:
a block copolymer of ethylene oxide and propylene oxide; and
a polyoxyethylene-polyoxypropylene block copolymer.

13. The glass fiber of claim 12, wherein said boron-containing compound is selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate; and
wherein said at least one organic acid is selected from the group consisting of acetic acid, formic acid, succinic acid and citric acid.

14. The glass fiber of claim 8, wherein said at least one aminosilane coupling agent is present in said sizing composition in an amount from 0.4-0.8% by weight solids, said at least one epoxy silane coupling agent is present in said sizing composition in an amount from 10-20% by weight solids, said non-ionic lubricant is present in said sizing composition in an amount from 6-10% by weight solids, said cationic lubricant is present in said sizing composition in an amount from 0.01-1.0% by weight solids, said antistatic agent is present in said sizing composition in an amount from 0.4-0.80% by weight solids, said at least one organic acid is present in said sizing composition in an amount from 0.4-1.0% by weight solids and said boron-containing compound is present in said sizing composition in an amount from 0.2-3.0% by weight solids.

15. A reinforced composite article comprising:
a plurality of glass fibers at least partially coated with a sizing composition including:
60-90% by weight solids of an epoxy resin emulsion including a liquid epoxy resin having an epoxy equivalent weight from 180-210 and at least one surfactant;
5-10% by weight solids of a polyurethane film former;
a silane package having at least one aminosilane coupling agent and at least one epoxy silane coupling agent;
a cationic lubricant;
a non-ionic lubricant;
an antistatic agent;
at least one organic acid; and
a boron-containing compound.

16. The reinforced composite article of claim 15, wherein said liquid epoxy resin has an epoxy equivalent weight of 185-192.

17. The reinforced composite article of claim 16, wherein said at least one aminosilane coupling agent includes aminopropyltriethoxysilane, said at least one epoxy silane coupling agent includes γ-glycidoxypropyltrimethoxysilane, and said boron containing compound is boric acid.

18. The reinforced composite article of claim 15, wherein said at least one organic acid is selected from the group consisting of acetic acid, formic acid, succinic acid and citric acid.

19. The reinforced composite article of claim 15, wherein said boron-containing compound is selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate.

20. The reinforced composite article of claim 15, wherein said at least one aminosilane coupling agent is present in said sizing composition in an amount from 0.4-0.8% by weight solids, said at least one epoxy silane coupling agent is present in said sizing composition in an amount from 10-20% by weight solids, said non-ionic lubricant is present in said sizing composition in an amount from 6-10 by weight solids, said cationic lubricant is present in said sizing composition in an amount from 0.01-1.0% by weight solids, said antistatic agent is present in said sizing composition in an amount from 0.4-0.8% by weight solids, said at least one organic acid is present in said sizing composition in an amount from 0.4-1.0% by weight solids and said boron-containing compound is present in an amount from 0.2-3.0 by weight solids.

21. The reinforced composite article of claim 15, wherein said glass fiber is selected from the group consisting of HP-type glass, A-type glass, C-type glass, E-type glass, S-type glass, R-type glass, AR-type glass and E-CR-type glass.

22. The reinforced composite article of claim 15, wherein said reinforced composite article is selected from the group consisting of wind turbine blades, wind turban nacelles, aircraft interior parts, aircraft exterior parts, vehicle armor, infrastructure armor, transmission cable, automotive parts, high pressure tanks, high pressure pipe, oil platform structures, electronic devices, ceramic ware, heat resistant substrates and filtration substrates.

* * * * *